(12) United States Patent
Kessler (10) Patent No.: US 9,223,637 B1
(45) Date of Patent: Dec. 29, 2015

(54) METHOD AND APPARATUS TO ADVISE SPIN AND YIELD DECISIONS

(75) Inventor: Peter B. Kessler, Palo Alto, CA (US)

(73) Assignee: Oracle America, Inc., Redwood City, CA (US)

(*) Notice: Subject to any disclaimer, the term of this patent is extended or adjusted under 35 U.S.C. 154(b) by 1477 days.

(21) Appl. No.: 11/831,292

(22) Filed: Jul. 31, 2007

(51) Int. Cl.
*G06F 9/46* (2006.01)
*G06F 9/52* (2006.01)
*G06F 9/54* (2006.01)

(52) U.S. Cl.
CPC ........ *G06F 9/52* (2013.01); *G06F 9/526* (2013.01); *G06F 9/54* (2013.01); *G06F 9/468* (2013.01); *G06F 9/544* (2013.01)

(58) Field of Classification Search
None
See application file for complete search history.

(56) References Cited

U.S. PATENT DOCUMENTS

| | | | | |
|---|---|---|---|---|
| 4,604,694 A * | 8/1986 | Hough | ............ | 710/200 |
| 4,807,111 A * | 2/1989 | Cohen et al. | ............ | 710/54 |
| 5,502,840 A * | 3/1996 | Barton | ............ | 710/200 |
| 6,223,204 B1 * | 4/2001 | Tucker | ............ | 718/103 |
| 6,687,904 B1 * | 2/2004 | Gomes et al. | ............ | 718/102 |
| 6,782,440 B2 * | 8/2004 | Miller | ............ | 710/200 |
| 6,832,295 B1 * | 12/2004 | Stonecypher | ............ | 711/135 |
| 7,366,878 B1 * | 4/2008 | Mills et al. | ............ | 712/214 |
| 7,594,234 B1 * | 9/2009 | Dice | ............ | 718/108 |
| 7,844,973 B1 * | 11/2010 | Dice | ............ | 718/108 |
| 2003/0236816 A1 * | 12/2003 | Venkatasubramanian | ... | 709/107 |
| 2004/0010499 A1 * | 1/2004 | Ghosh et al. | ............ | 707/100 |
| 2004/0261080 A1 * | 12/2004 | Chan et al. | ............ | 719/310 |
| 2005/0080963 A1 * | 4/2005 | Schopp | ............ | 710/200 |
| 2005/0081204 A1 * | 4/2005 | Schopp | ............ | 718/100 |
| 2006/0031841 A1 * | 2/2006 | Anand et al. | ............ | 718/102 |
| 2007/0124545 A1 * | 5/2007 | Blanchard et al. | ............ | 711/152 |
| 2007/0124546 A1 * | 5/2007 | Blanchard et al. | ............ | 711/152 |
| 2007/0169002 A1 * | 7/2007 | Kronlund et al. | ............ | 717/130 |
| 2007/0234326 A1 * | 10/2007 | Kejariwal et al. | ............ | 717/151 |
| 2007/0271450 A1 * | 11/2007 | Doshi et al. | ............ | 712/245 |
| 2007/0280224 A1 * | 12/2007 | Ho | ............ | 370/386 |
| 2008/0155546 A1 * | 6/2008 | Ruemmler | ............ | 718/102 |

* cited by examiner

*Primary Examiner* — Hiren Patel
(74) *Attorney, Agent, or Firm* — Brooks Kushman P.C.

(57) ABSTRACT

Methods and apparatus provide for a busy resource encoder to allow for a finer control of spin versus yield decisions. Specifically, the busy resource encoder allows for the execution a first thread, where the first thread is using a particular resource. Additionally, the busy resource encoder allows for the execution of a second thread, where the second thread requires use of the resource which is locked due to first thread execution. The busy resource encoder creates a busy code to indicate the progress of the execution of the first thread in relation to use of the resource by the first thread. The second thread can then read the busy code to determine to execute one of a spin and a yield routine by the second thread.

20 Claims, 9 Drawing Sheets

> 440 CHANGE THE VALUE OF THE VARIABLE ACCORDING TO THE MEASURE OF COMPLETENESS OF THE EXECUTION OF THE FIRST THREAD IN THE RELATION TO USE OF THE RESOURCE
>
>> 510 ASSIGN THE VARIABLE A PREDETERMINED YIELD VALUE TO INDICATE TO THE SECOND THREAD TO INITIATE EXECUTION OF THE YIELD ROUTINE
>
>> 520 ASSIGN THE VARIABLE A PREDETERMINED ACCESS VALUE TO INDICATE TO THE SECONDTHREAD THAT THE PROGRESS OF THE EXECUTION OF THE FIRST THREAD IN RELATION TO USE OF THE RESOURCE BY THE FIRST THREAD IS COMPLETE AND THE RESOURCE IS UNLOCKED AND AVAILABLE TO THE SECOND THREAD
>
>> 530 ASSIGN THE VARIABLE A SPIN VALUE TO ADVICE A NUMBER OF SPIN-LOOP CYCLES OF THE SPIN ROUTINE TO BE EXECUTED BY THE SECOND THREAD BEFORE ATTEMPTING TO READ THE BUSY CODE AGAIN, THE SPIN VALUE BASED UPON THE MEASURE OF COMPLETENESS

340 READ THE BUSY CODE TO DETERMINE TO EXECUTE ONE OF A SPIN AND A YIELD ROUTINE BY THE SECOND THREAD

610 COMPARE THE BUSY CODE AGAINST A YIELD VALUE DEFINED FOR THE SECOND THREAD, THE YIELD VALUE DEFINED FOR THE SECOND THREAD DESCRIBING A CONDITION TO INITIATE EXECUTION OF THE YIELD ROUTINE BY THE SECOND THREAD DESPITE THE VALUE OF THE BUSY CODE

METHOD AND APPARATUS TO ADVISE SPIN AND YIELD DECISIONS

BACKGROUND

In conventional systems, the speed and efficiency of many computing applications depend in large part upon the availability of processing resources. To this end, conventional computer systems provide computing architectures that commonly incorporate multithreaded processes that enable the sharing of resources in order to accommodate multiple paths of execution within a computer/operating system. As such, a thread may be characterized as a separately executable portion of a process. Each thread typically has its own distinct program counter and represents a separate movement of a processor through program instruction space and storage. In this manner, a program may be broken-up into multiple different threads. Ideally, this segmentation avoids requiring a computer process to execute a single unitary process or program from start to finish with pronounced intervals of wasted processing time. As such, a thread continuously accesses a resource until either its execution is interrupted or that thread must wait for a resource it requires to become available.

To facilitate coordination of threads and associated resources, threads typically share a priority scheme or schedule that partially dictates allocation of processing cycles as between different threads. A task dispatcher program may use this scheme to assign and dispatch a central processing unit(s) (CPU), timeslice, or other resource to each thread. Such exemplary resources might include hardware registers, database files and other memory resources. Thus, multithreaded operation can provide the illusion of simultaneous execution of multiple programs, given the relatively high processing speeds relative to that of other resources in the computer.

As a consequence, when synchronizing multiple threads of control in conventional systems, often one thread owns a resource that another thread needs. When one thread finds that another thread owns such a resource, the thread can either "spin" to wait for the resource to be released, or "yield", thereby giving up the processor to be notified when the resource is available.

Spinning is a technique in which a process repeatedly checks to see if a condition is true, such as waiting for keyboard input or waiting for a lock (i.e. a lock on a required resource) to become available. Spinning can also be used to delay execution for some amount of time; this was necessary on old computers that had no method of waiting a specific length of time other than by repeating a useless loop a specific number of times. Spinning can be a valid strategy in certain special circumstances, most notably in the implementation of spinlocks within conventional operating systems designed to run on SMP systems.

A spinlock is a lock where the thread simply waits in a loop ("spins") repeatedly checking until the lock becomes available. As the thread remains active but isn't performing a useful task, the use of such a lock is a kind of busy waiting. Once acquired, spinlocks will usually be held until they are explicitly released, although in some typical implementations they may be automatically released. Conventional spinlocks are efficient if threads are only likely to be blocked for a short period of time, as they avoid overhead from operating system process re-scheduling or context switching. For this reason, spinlocks are often used inside typical operating system kernels.

SUMMARY

Conventional computer systems suffer from a variety of deficiencies. For example, spinning can become wasteful if a thread spins for a long period of time. The longer the lock is held on a resource, the greater the risk of interruption by the O/S scheduler. If this happens, other threads will be left spinning on the lock, despite the fact that progress is not made towards releasing the lock. This is especially true on a conventional single-processor system, where each waiting thread of the same priority is likely to waste its full quantum spinning until the thread that holds the lock is finally re-scheduled.

Another deficiency observed in conventional systems is the reality that implementing spinlocks ("spinning") is difficult because of the possibility of simultaneous access to the lock. Generally, this is only possible with special assembly language instructions, such as atomic test-and-set operations, and cannot be implemented from high level languages like C.

Yet another deficiency associated with spinning in conventional systems is that threads and processes do not have any way to predict the future behavior of a lock on a resource in order to make the right choice between spinning and yielding. Due to this lack of predictability, previous conventional solutions would either have a "locked out" process to either always decide to spin or always decide to yield regardless of the status of the process actually using the sought after resource. Thus, conventional systems provide no way for a thread competing for a resource to predict which decision (to spin or to yield) is ultimately the best choice.

Techniques discussed herein significantly overcome the deficiencies of conventional applications such as those discussed above as well as additional techniques also known in the prior art. As will be discussed further, certain specific embodiments herein are directed to a busy resource encoder. The one or more embodiments of the busy resource encoder as described herein contrast with conventional systems to allow for a finer control of spin versus yield decisions. The busy resource encoder allows such a decision to be made regarding an expected competition for individual resources between one or more threads (i.e. processes, operations) by updating "busy" information (e.g. a BUSY code) as an owner thread progresses in its use of the resource. Specifically, a BUSY encoding is used to provide information from the owner of the resource about when the resource is likely to be available. Such information thereby allows a thread that is waiting and competing for the resource to decide which decision, to spin or to yield, is most likely the most efficient choice.

Specifically, the busy resource encoder allows for the execution of a first thread, where the first thread is using a particular resource. Additionally, the busy resource encoder allows for the execution of a second thread, where the second thread requires use of the resource which is locked due to first thread execution. The busy resource encoder creates a busy code to indicate the progress of the execution of the first thread in relation to use of the resource by the first thread. The second thread can then read the busy code to determine to execute one of a spin and a yield routine by the second thread.

It is to be understood that the system disclosed herein may be embodied strictly as a software program, as software and hardware, or as hardware alone. The embodiments disclosed herein, may be employed in data communications devices and other computerized devices and software systems for such devices such as those manufactured by Sun Microsystems Incorporated of Santa Clara, Calif., U.S.A., herein after referred to as "Sun."

BRIEF DESCRIPTION OF THE DRAWINGS

The foregoing and other objects, features and advantages of the invention will be apparent from the following more particular description of embodiments of the methods and apparatus for a busy resource encoder to allow for a finer control of spin versus yield decisions, as illustrated in the accompanying drawings and figures in which like reference characters refer to the same parts throughout the different views. The drawings are not necessarily to scale, with emphasis instead being placed upon illustrating the embodiments, principles and concepts of the methods and apparatus in accordance with the invention.

DETAILED DESCRIPTION

Methods and apparatus provide for a busy resource encoder to allow for a finer control of spin versus yield decisions. Specifically, the busy resource encoder allows for the execution a first thread, where the first thread is using a particular resource. Additionally, the busy resource encoder allows for the execution of a second thread, where the second thread requires use of the resource which is locked due to first thread execution. The busy resource encoder creates a busy code to indicate the progress of the execution of the first thread in relation to use of the resource by the first thread. The second thread can then read the busy code to determine to execute one of a spin and a yield routine by the second thread.

The busy resource encoder allows such a decision to be made regarding an expected competition for individual resources between one or more threads (i.e. processes, operations) by updating "busy" information (e.g. a BUSY code) as an owner thread progresses in its use of the resource. Specifically, a BUSY code is used to provide information from the owner of the resource about when the resource is likely to be available. Such information thereby allows a thread that is waiting and competing for the resource to decide which decision, to spin or to yield, is most likely the most efficient choice.

As a first thread uses a resource it can "lock" that resource, thereby preventing other threads from accessing and using the resource. This can force the other threads to wait for the resource to eventually become available once the first thread has completed using the resource. The busy resource encoder allows a second thread seeking to use a locked resource to make an informed decision in regards to spinning or yielding while the first thread uses the resource.

For the BUSY code, a variable (e.g. address, word, bit, field, tag, or the like) can be reserved to correspond to the resource. Any thread seeking use of the resource can access the variable to obtain information about the availability of the resource. The BUSY code can be manipulated (i.e. updated, set, cleared) by the busy resource encoder according to the progress of the execution of the first thread in regards to its use of the resource. For example, the first thread may not be completely executed, however, it may no longer actually require the resource for its remaining execution steps. Any thread that is locked out from the resource can use the current value of the BUSY code (i.e. the variable) to decide what to do—spin or yield.

A yield value for the BUSY code can be predetermined. When the BUSY code (i.e. the value of the variable used to represent the BUSY code) equals the yield value, then the BUSY code represents to other threads contending for access to the resource that the most efficient choice is to yield. Also, an access value for the BUSY code is predetermined. When the BUSY code equals the access value, then the BUSY code represents to other threads that the first thread is done using the resource and that the resource is now unlocked and is available to be used by a second thread.

The BUSY code corresponding to the resource can also hold a spin value. The spin value represents to a locked out thread how many spin cycles of a spin routine to execute before attempting another read of the BUSY code. It is understood that the busy resource encoder can continually update the BUSY code. As the first thread utilizes the resource to further a portion of the first thread's execution that requires the resource, progress of the first thread is monitored. Such monitoring allows for creating a measure of completeness of the first thread's execution. The busy resource encoder can process the measure of completeness to assign a value (e.g. the access value, the yield value, the spin value) to the BUSY code. As the busy resource encoder is continually updating the BUSY code as a result of the such monitoring, multiple competing threads can make different decisions as to spinning and yielding.

To further a discussion of various embodiments of the busy resource encoder, example pseudocode is provided below. It is understood that a person having ordinary skill in the art would recognize that pseudocode is a compact and informal high-level description of a computer programming algorithm that uses the structural conventions of programming languages, but omits detailed subroutines, variable declarations or language-specific syntax. Such a pseudocode programming language can be augmented with natural language descriptions of the details, where convenient. Regarding the pseudocode below, an example spinning algorithm is provided to allow a thread to spin in order to wait to read (access) an object ("obj") while a garbage collector thread copies the object:

SPIN:
  LD Obj→fwd, f
  test f for BUSY encoding if BUSY goto SPIN Here, the pseudocode is written according to an expectation that copying an object can be completed within a short duration, so the pseudocode programs a competing thread that is waiting to read (i.e. access) the object to execute the spin routine. However, if the object is large, or requires touching many memory pages, it will ultimately require the competing thread to execute thousands of spin cycles through the pseudocode. At some point in time during the spinning, the alternative of yielding at the outset becomes the better, profitable choice. Conventional systems provide no way for a thread competing for a resource to predict which decision (to spin or to yield) is ultimately the best choice.

Unlike conventional systems, the busy resource encoder provides for a BUSY encoding as an indication of how much longer the resource (i.e. a locked resource) will be busy, thereby providing a thread competing for that resource with greater control and predictability as to the effectiveness and profitability of a spin or yield decision.

In one embodiment where the busy resource encoder involves the provided psuedocode, the forwarding pointer, f, has a lower order bit used as a variable for the BUSY code that can be cleared or set. The busy resource encoder employs a BUSY encoding such that if the lower order bit is clear then "f" represents a forwarding pointer, but if the lower order bit is set then "f" represents a count of the number of cycles until the resource will be available. Thus, when copying a short (i.e. small) object, the garbage collector thread can install a small BUSY encoding (e.g. a small BUSY code), whereas if it were copying a multi-megabyte array (i.e. a large object), it could install a larger BUSY encoding. The competing thread can use the BUSY encoding (along with other information about the state of the machine, other threads, etc.) to make a more informed decision whether to spin or to yield. Hence, the small BUSY code will trigger a spin routine, whereas a larger BUSY code may trigger a decision to yield.

In another embodiment, if the thread using the resource found that the BUSY code was inaccurate (i.e. the time estimate as indicated by the BUSY code was incorrect), the busy resource encoder can update the BUSY code to provide more accurate information to competing threads. Hence, previous competing threads can then reread the "new" BUSY code and any new competing threads can also take advantage of the revised estimate indicated by the "new" busy code. For example, as the garbage collector thread (which currently owns the resource) works its way through a multi-megabyte array, the BUSY encoding can be updated to indicate a lesser waiting time such that any threads that have arrived towards the end of the garbage collector thread's copying would most likely decide that a better choice would be to spin instead of yield.

Conversely, if the garbage collector thread detected that the copy it was executing is taking longer than a previous estimate (e.g., a partial garbage collection needs to fall back on a complete collection), the BUSY encoding would be updated to reflect the new estimate of its use of the resource so any competing threads (current or new), including those currently spinning, would decide to yield instead of spinning once they read the new BUSY code.

In another embodiment, a first thread's execution can complete its use of a resource, thereby setting the BUSY code at a value that indicates to competing threads that the resource is currently available (unlocked). Two spinning threads can be competing for the resource, where one thread (the second thread) is given access to the resource upon reading the "available" status indicated by the BUSY code. Thus, a spinning third thread is still locked out of the resource once the second thread begins consuming the resource. As the second thread furthers its own execution in relation to the resource, the second thread's progress is monitored in order to update the BUSY code. Thus, the the BUSY code can be updated to advise all competing threads to yield even though the first thread had previously set the BUSY code to provide advice to spin. As the second thread begins an execution sequence that will utilize the resource for a long time, the BUSY code can be set to a predetermined "yield" BUSY code that can be identified by all competing threads. Hence, the spinning third thread will complete the number of spin-loops that was advised by the BUSY code based on the first thread. The spinning third thread will attempt to re-read the BUSY code and encounter the second thread's "yield" BUSY code. As a result, the third thread will initiate a yield routine as opposed to continue the spinning routine that was being executed while the first thread was using the resource. It is to be understood that monitoring functionality can be included in the threads themselves or can be included as a distinct functionality provided by a busy resource encoder 150 that interacts with threads.

Figure 1:
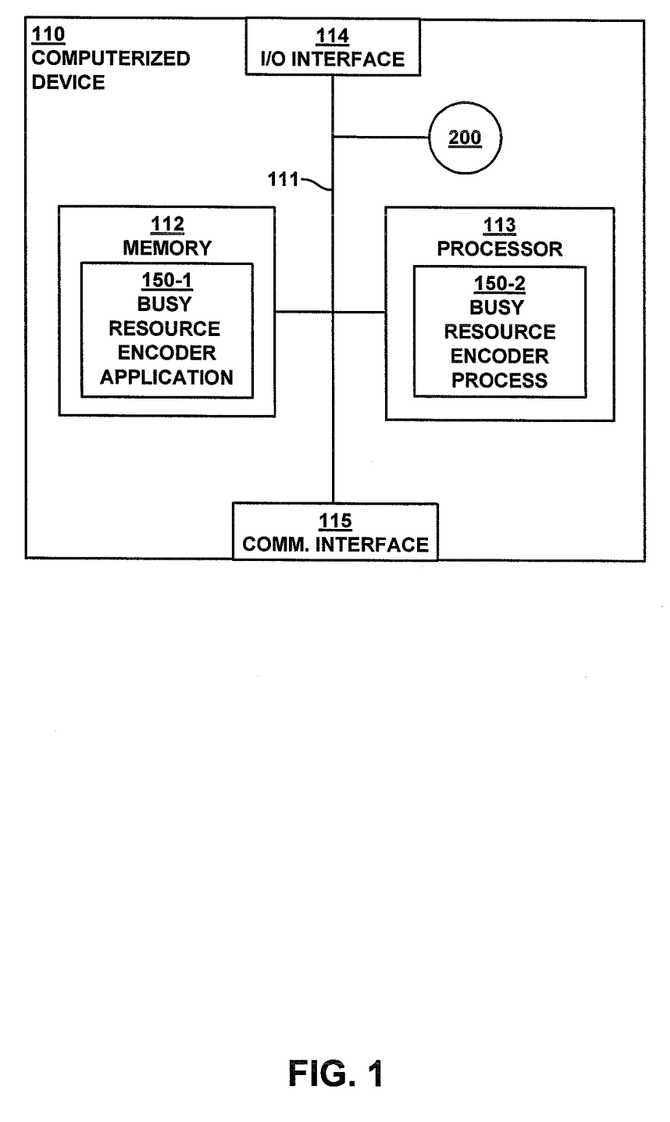
FIG. 1 is a block diagram of an architecture for a computer system that executes, runs, interprets, operates a busy resource encoder according to embodiments herein.

Turning now to FIG. 1, a block diagram illustrates an example of architecture for a computer system 110 that executes, runs, interprets, operates or otherwise performs a busy resource encoder application 150-1 and/or busy resource encoder process 150-2 (e.g. an executing version of the application 150-1 which can be controlled by a user) in relation to the use of resource 200 according to embodiments herein. The computer system 110 may be any type of computerized device such as a personal computer, workstation, portable computing device, console, laptop, network terminal or the like.

As shown in the present example, the computer system 110 includes an interconnection mechanism 111 such as a data bus, motherboard or other circuitry that couples a memory system 112, a processor 113, and an input/output interface 114. An input device (e.g., one or more user/developer controlled devices such as a keyboard, mouse, touch pad, etc.) couples to the computer system 110 and processor 113 through an input/output (I/O) interface 114.

The memory system 112 can be any type of computer readable medium and, in this example, is encoded with a busy resource encoder application 150-1 that supports generation, display, and implementation of functional operations as will be further explained herein.

During operation of the computer system 110, the processor 113 accesses the memory system 112 via the interconnect 111 in order to launch, run, execute, interpret or otherwise perform the logic instructions of the busy resource encoder application 150-1. Execution of the busy resource encoder application 150-1 in this manner produces a busy resource encoder process 150-2. In other words, the busy resource encoder process 150-2 represents one or more portions or runtime instances of the busy resource encoder application 150-1 (or the entire application 150-1) performing or executing within or upon the processor 113 in the computerized device 110 at runtime.

Other embodiments of a busy resource encoder disclosed herein also include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein.

Figure 2:
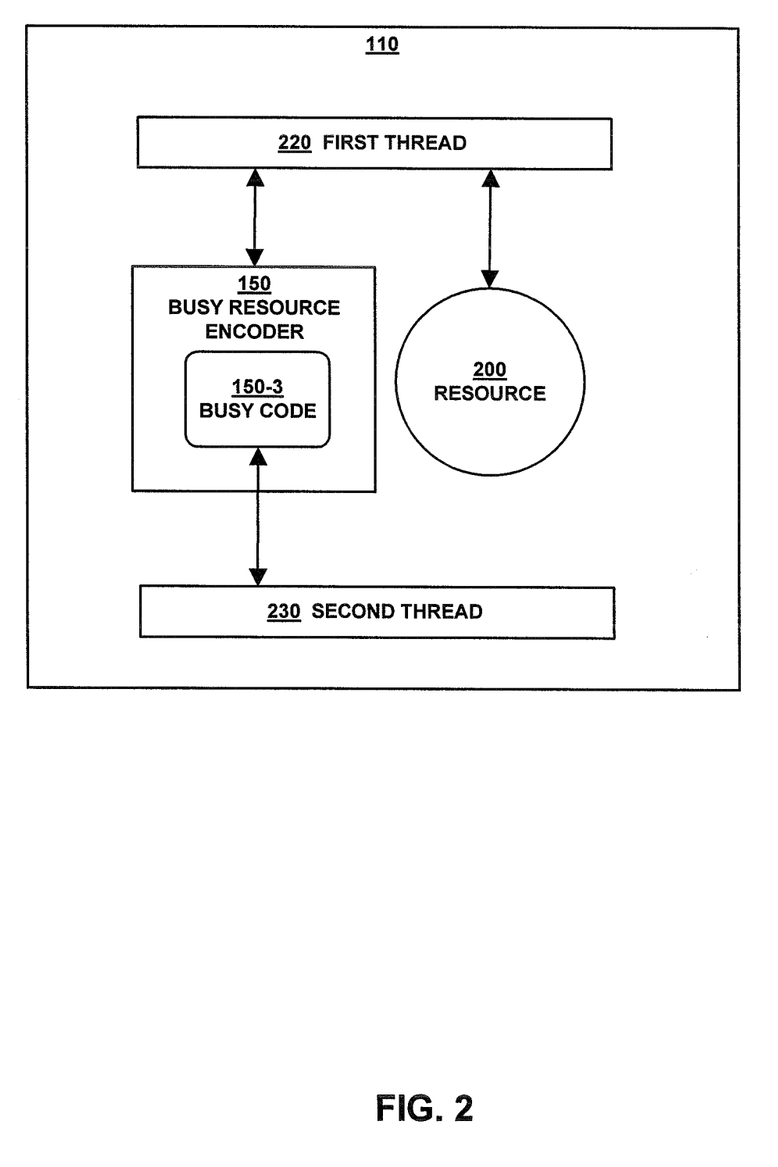
FIG. 2 is a block diagram of a computer system configured with a busy resource encoder according to embodiments herein.

FIG. 2 is a block diagram of a computer system configured with a busy resource encoder 150 according to embodiments herein. The computerized device 110 includes a first thread 220 and a second thread 230 competing for used of a resource 200. It is understood that the computerized device 110 can involve a multitude of threads competing for a multitude of resources. A busy resource encoder 150 is further included and provides a BUSY code 150-3. The BUSY code 150-3 corresponds to the resource 200 and, more particularly, it corresponds to the first thread's 220 progress of execution in regards to its use of the resource 200. As depicted in FIG. 2, the first thread 220 is executing and utilizing the resource 200. Thus, the resource 200 is "locked" out to any competing threads. Thus, the second thread 230 must read the BUSY code 150-3 in order to decide whether it is more profitable to spin or yield while the first thread 220 uses the resource 200.

Figure 3:
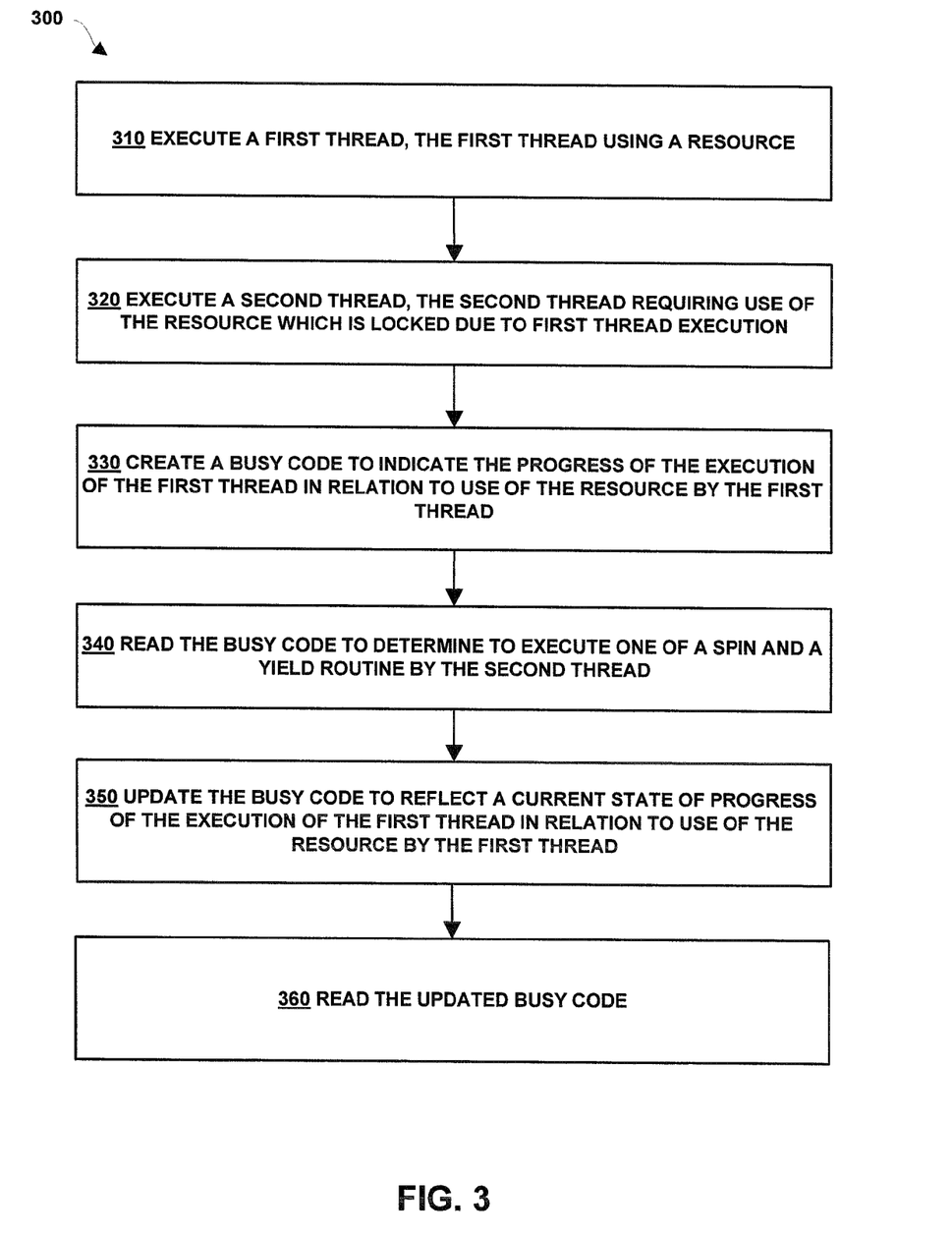
FIG. 3 is a flowchart of processing steps performed by a busy resource encoder to create a busy code to indicate the progress of the execution of the first thread in relation to use of the resource by the first thread according to embodiments herein.

FIG. 3 is a flowchart 300 of processing steps 310-360 performed by a busy resource encoder 150 to create a BUSY code 150-3 to indicate the progress of the execution of the first thread 220 in relation to use of the resource 200 by the first thread 220 according to embodiments herein. The steps in flowchart 300 refer to the features illustrated in the block diagrams of FIGS. 1 and 2.

At step 310, the busy resource encoder 150 executes a first thread 220, the first thread 220 using a resource 200. At step 320, the busy resource encoder 150 executes a second thread 230, the second thread 230 requiring use of the resource 200 which is locked due to first thread 220 execution. At step 330, the busy resource encoder 150 creates a BUSY code 150-3 to indicate the progress of the execution of the first thread 220 in relation to use of the resource 200 by the first thread 220. At step 340, the busy resource encoder 150 reads the BUSY code 150-3 to determine to execute one of a spin and a yield routine by the second thread 230.

At step 350, the busy resource encoder 150 updates the BUSY code 150-1 to reflect a current state of progress of the execution of the first thread 220 in relation to use of the resource 200 by the first thread 220. At step 360, the busy resource encoder 150 reads the updated BUSY code 150-3. As the busy resource encoder 150 reads the updated BUSY code 150-3, it allows for one or more competing threads to determine to execute either a spin or a yield routine. For a second thread 230 that previously yielded or started spinning according to a previous BUSY code 150-3, the updated BUSY code 150-3 can provide the second thread 230 with new advice as to which decision is ultimately more profitable. Based on the updated BUSY code 150-3, the second thread 230 can either continue the routine it initiated according to a previous value of the BUSY code 150-3 or use the updated value of the BUSY code 150-3 to make a "new" decision to spin or yield. Additionally, new threads can begin competing for the resource 200 in between the instances when the second thread 230 read the BUSY code 150-3 and the updated BUSY code 150-3. Thus, the new competing threads can also read the updated BUSY code 150-3 to make their own spin or yield decisions.

Figure 4:
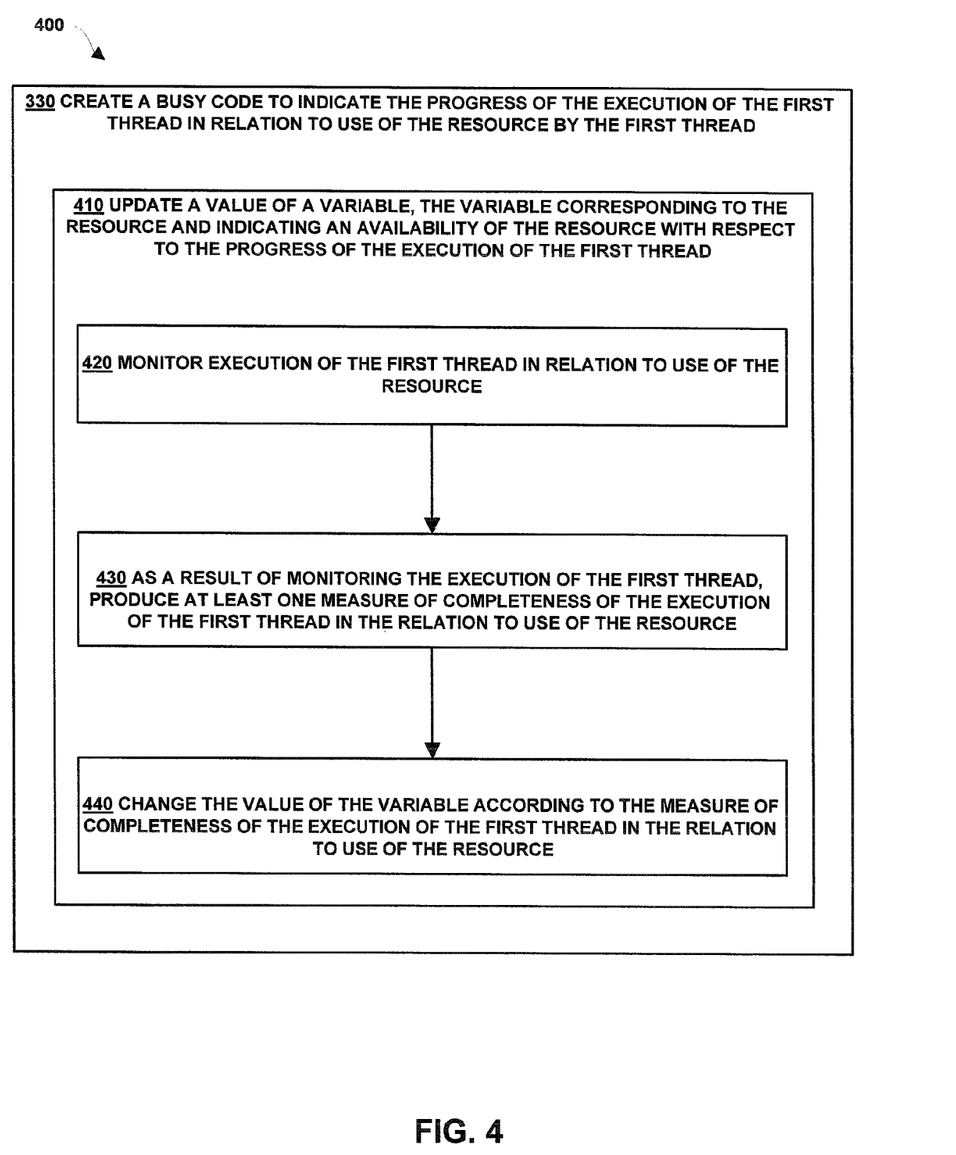
FIG. 4 is a flowchart of processing steps performed by a busy resource encoder to update a value of a variable corresponding to the resource and indicating an availability of the resource with respect to the progress of the execution of the first thread according to embodiments herein.

FIG. 4 is a flowchart 400 of processing steps 410-440 performed by a busy resource encoder 150 to update a value of a variable corresponding to the resource 200 and indicating an availability of the resource 200 with respect to the progress of the execution of the first thread 220 according to embodiments herein. The steps in flowchart 400 refer to the features illustrated in the block diagrams of FIGS. 1 and 2.

At 410, the busy resource encoder 150 updates a value of a variable (used for the BUSY code 150-3), the variable corresponding to the resource 200 and indicates an availability of the resource 200 with respect to the progress of the execution of the first thread 220. In order to update the BUSY code 150-3, at step 420, the busy resource encoder 150 monitors execution of the first thread 220 in relation to use of the resource 200. As a result of monitoring the execution of the first thread 220, at step 430, the busy resource encoder 150 produces at least one measure of completeness of the execution of the first thread 220 in the relation to use of the resource 200. At step 440, the busy resource encoder 150 changes the value of the variable (used for the BUSY code 150-3) according to the measure of completeness of the execution of the first thread 220 in the relation to use of the resource 200.

Figure 5:
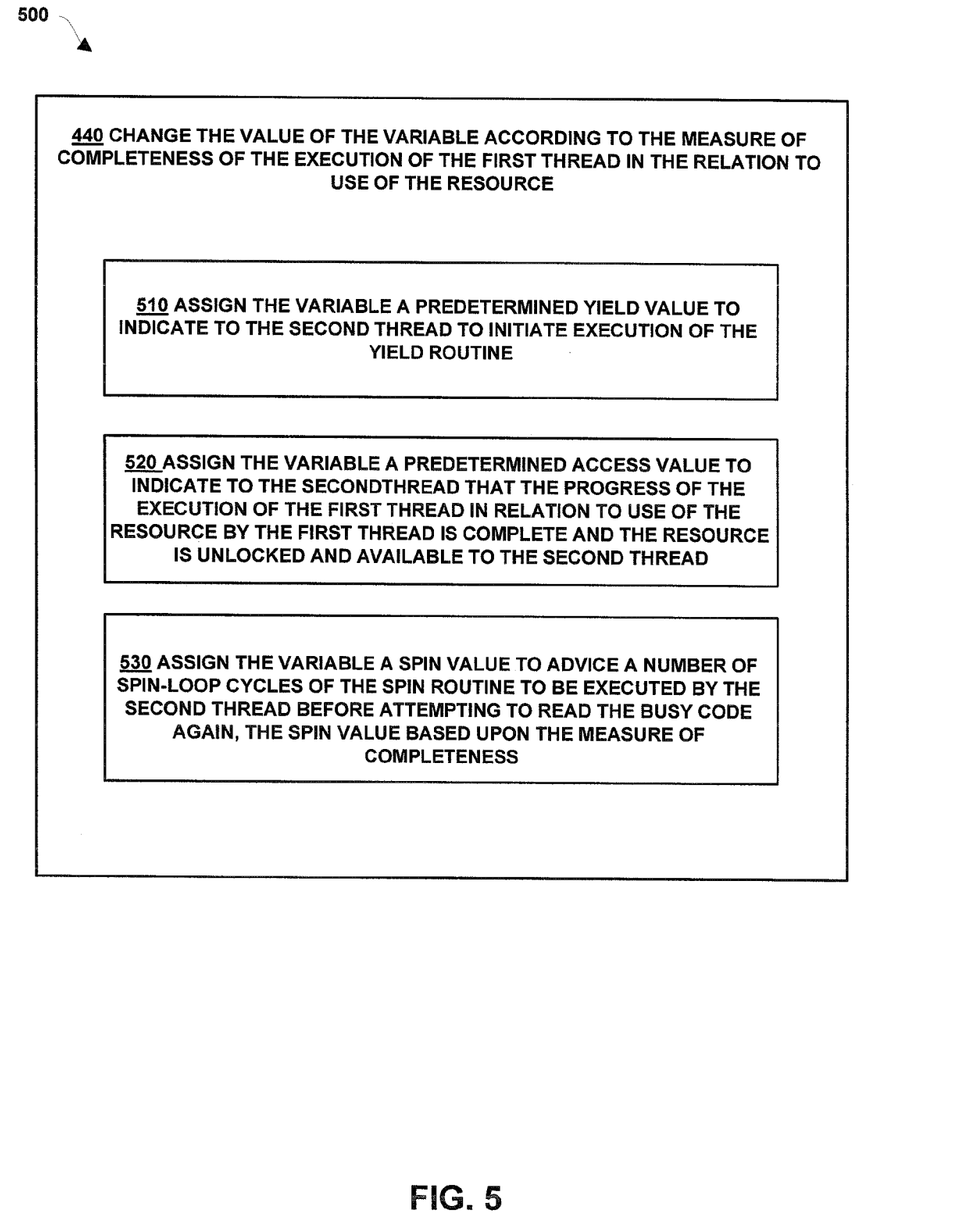
FIG. 5 is a flowchart of processing steps performed by the busy resource encoder to change a value of the variable corresponding to the resource according to the measure of completeness of the execution of the first thread in the relation to use of the resource according to embodiments herein.

FIG. 5 is a flowchart 500 of processing steps 510-530 performed by the busy resource encoder 150 to change a value of the variable corresponding to the resource 200 according to the measure of completeness of the execution of the first thread 220 in the relation to use of the resource 200 according to embodiments herein. The steps in flowchart 500 refer to the features illustrated in the block diagrams of FIGS. 1 and 2. For FIG. 5 specifically, the order of the steps for flowchart 500 are arbitrary.

At step 510, the busy resource encoder 150 assigns the variable (used for the BUSY code 150-3) a predetermined yield value to indicate to the second thread 230 to initiate execution of the yield routine. The yield value can be predetermined by the busy resource encoder 150 and identified by any thread competing for use of the resource 200. Upon reading the BUSY code 150-3 because the resource 200 is "locked out," if the second thread 230 reads the BUSY code 150-3 as equal to the yield value, the second thread 230 "knows" that there is a very high probability that executing a yield routine is clearly the most profitable decision—as opposed to spinning.

At step 520, the busy resource encoder 150 assigns the variable (used for the BUSY code 150-3) a predetermined access value to indicate to the second thread 230 that the progress of the execution of the first thread 220 in relation to use of the resource 200 by the first thread 220 is complete and the resource 200 is unlocked and available to the second thread 230. Similar to the predetermined yield value, the access value can be predetermined by the busy resource encoder 150 and identified by any thread competing for use of the resource 200. As the first thread 220 is done using the resource 200, it can progress its execution but release the resource 200. Hence, the resource 200 can be unlocked and available to the second thread 230 (and/or other threads). The BUSY code 150-3 can equal the predetermined access value to signal to the second thread 230 that no decision to spin or yield is necessary, and instead the second thread 230 can utilize the "unlocked" resource 200.

At step 530, the busy resource encoder 150 assigns the variable (used for the BUSY code 150-3) a spin value advises the second thread 230 (and any other competing thread) of a number of spin-loop cycles of the spin routine to be executed by the second thread 230 before attempting to read the BUSY code 150-3 again, the spin value based upon the measure of completeness. As the second thread 230 reads the BUSY code 150-3, it is not necessarily relegated to only considering the BUSY code 150-3 as a determination to spin or yield is made. In some embodiments, the busy resource encoder 150 allows the second thread 230 (or any other thread competing for the resource 200) to process the BUSY code 150-3 according to a consideration to variety of system and performance metrics, such as a machine state metric, a second thread metric, and a resource metric.

Figure 6:
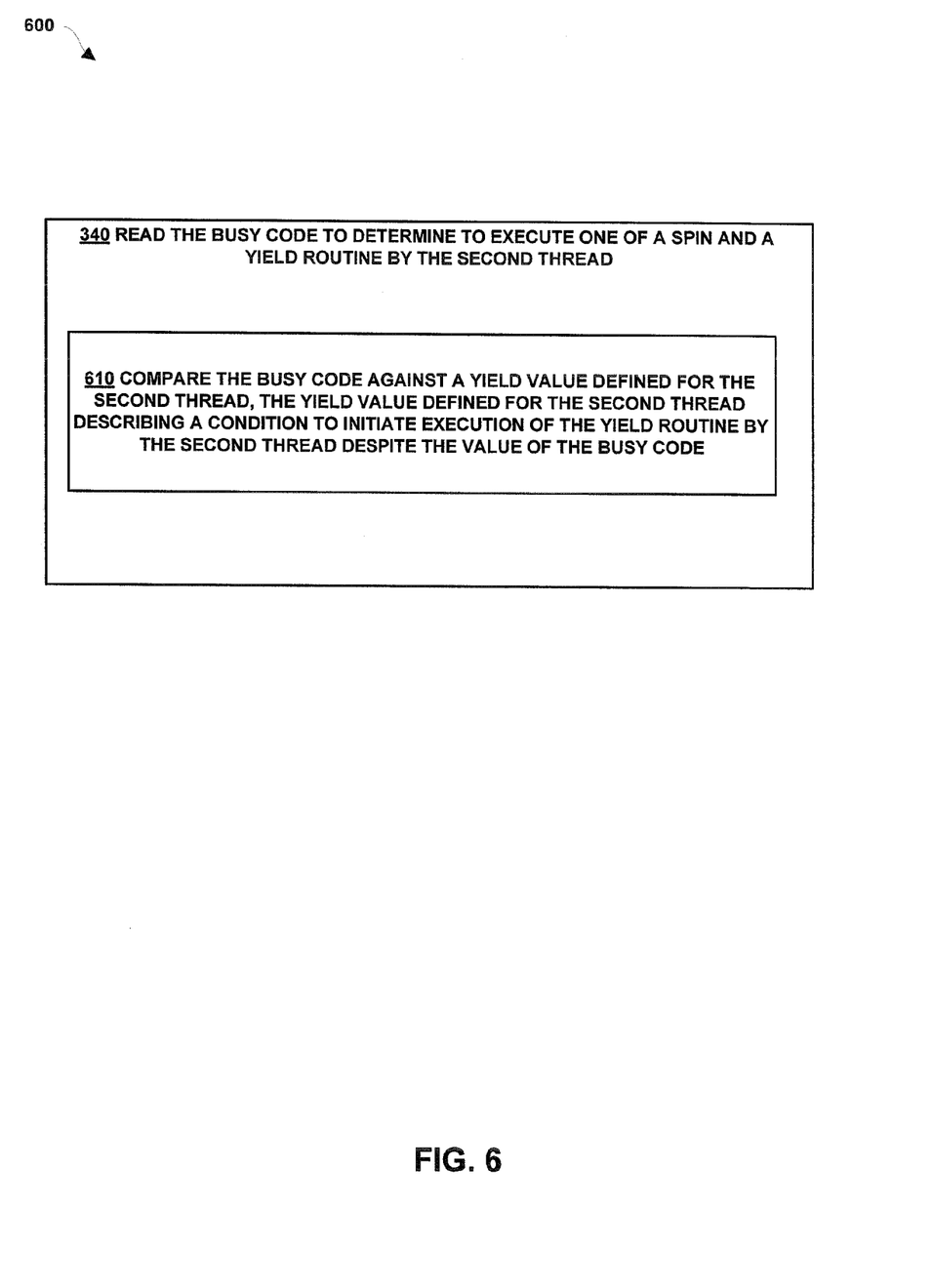
FIG. 6 is a flowchart of processing step performed by a busy resource encoder to read the busy code to determine to execute one of a spin and a yield routine by the second thread according to embodiments herein.

FIG. 6 is a flowchart 600 of processing step 610 performed by a busy resource encoder 150 to read the BUSY code 150-3 to determine to execute one of a spin and a yield routine by the second thread 230 according to embodiments herein. The step of flowchart 600 refer to the features illustrated in the block diagrams of FIGS. 1 and 2.

At step 610, the busy resource encoder 150 compares the BUSY code 150-3 against a yield value defined for the second thread 230. The yield value defined for the second thread 230 describes a condition to initiate execution of the yield routine by the second thread 230 despite the value of the BUSY code 150-3. For example, the busy resource encoder 150 can provide a BUSY code 150-3 with a spin value to communicate to the second thread 230 a number of spin cycles to execute before the second thread 230 reads the BUSY code 150-3 again. However, if the second thread 230 has its own defined yield value, it can decide to yield instead of spin. Here the second thread's 230 yield value can describe a maximum spin cycle count. If the BUSY code 150-3 represents a spin value that is greater than the maximum spin cycle count (described by the second thread 230's yield value), the spinning is not profitable for the second thread 230—even though the BUSY code 150-3 does not equal the predetermined yield value of step 510. Thus, even though the BUSY code 150-3 can "advise" threads to spin, some threads can still choose to yield based on the conditions described by their own yield values.

Figure 7:
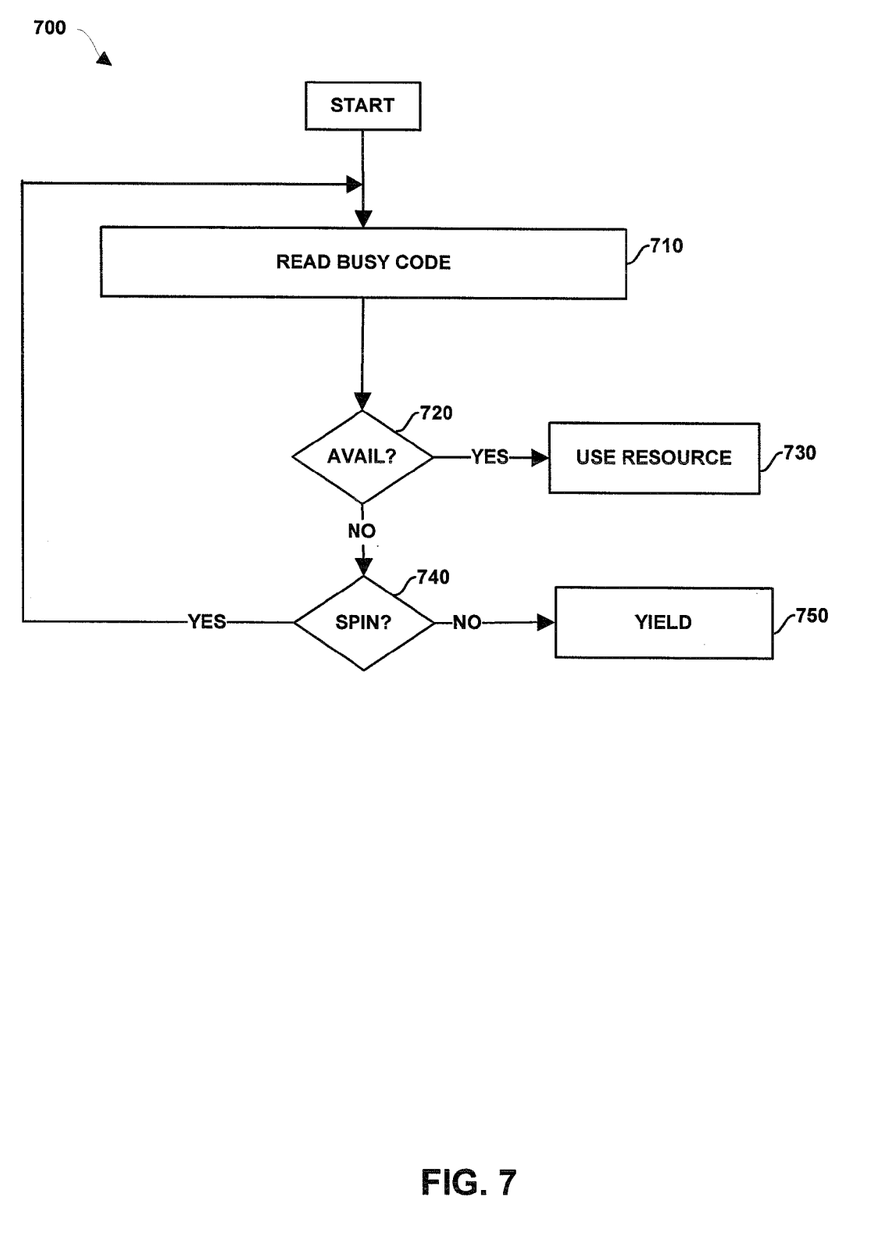
FIG. 7 is a flowchart of processing steps performed by a busy resource encoder to read the BUSY code to advise a thread to spin according to embodiments herein.

FIG. 7 is a flowchart 700 of processing steps performed by a busy resource encoder 150 to read a BUSY code 150-3 to advise a thread to spin. At step 710, a thread 230 attempting to use a resource 200 by reading the BUSY code 150-3. At step 720, if the resource 200 is available, the thread 230 can use the resource 200 at step 730. If the resource 200 is not available, the thread 230 can decide whether to spin at step 740. If spinning is not the most efficient choice, the thread 230 can yield at step 750.

Figure 8:
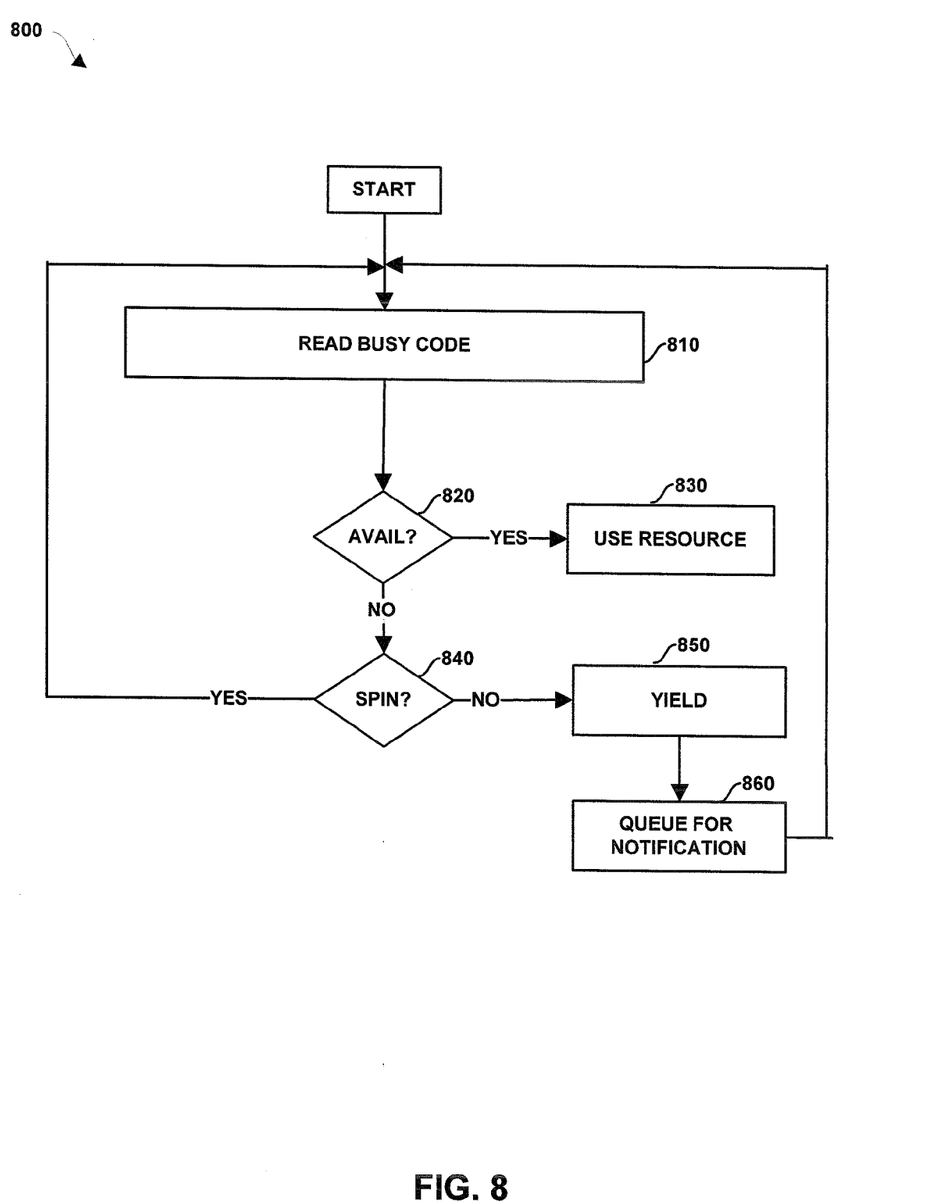
FIG. 8 is a flowchart of processing steps performed by a busy resource encoder to read a BUSY code to advise a thread to yield according to embodiments herein.

FIG. 8 is a flowchart 800 of processing steps performed by a busy resource encoder 150 to read a BUSY code 150-3 to advise a thread to yield. At step 810, a thread 230 attempting to use a resource 200 by reading the BUSY code 150-3. At step 820, if the resource 200 is available, the thread 230 can use the resource 200 at step 830. If the resource 200 is not available, the thread 230 can decide whether to spin at step 840. If spinning is not the most efficient choice, the thread 230 can yield at step 850. Once the thread decides to yield, at 860, it enters a queue to be notified when to read the BUSY code 150-3 again.

Figure 9:
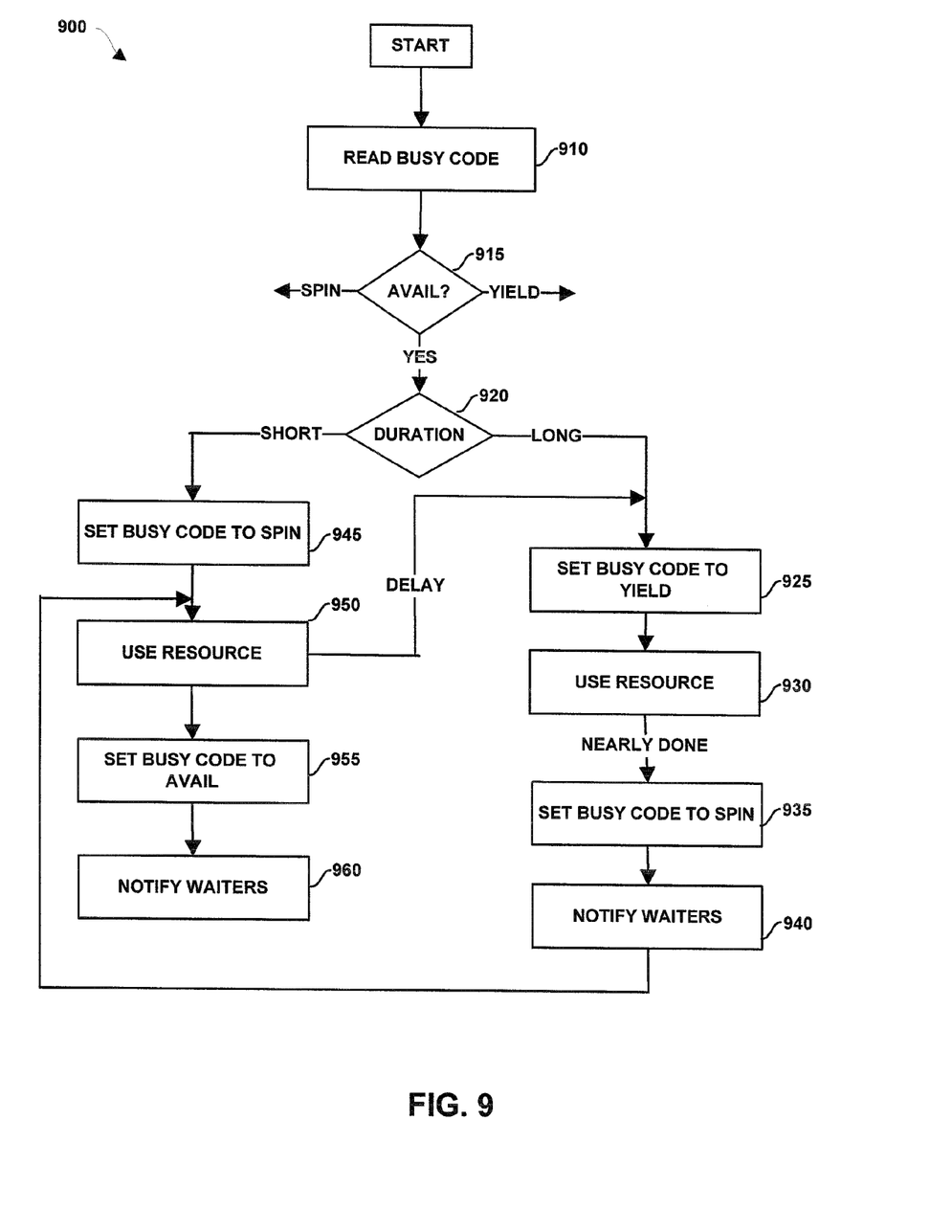
FIG. 9 is a flowchart of processing steps performed by a busy resource encoder to change the advice given via the BUSY code according to embodiments herein.

FIG. 9 is a flowchart 900 of processing steps performed by a busy resource encoder 150 to change the advice given via the BUSY code 150-3. It is understood that steps 910-915 have been previously described in FIGS. 7 and 8. At step 920, when a thread 220 has been informed that a resource 200 is available, it can monitor the duration of use of the resource. At step 925, if the thread's 220 use of the resource is for a long duration, the busy resource endcoder 150 can set the BUSY code 150-3 to "yield." At step 930, as the thread 220 uses the resource 200, the BUSY code 150-3 can be changed to "spin" as the thread 230 nears termination of the its use of the resource 200. At step 940, competing threads can be notified that the thread 220 is almost done with the resource 200 since the BUSY code 150-3 is telling them to spin and not yield, as in step 945.

At step 950, the thread 220 is executing its short term usage of the resource 200. However, if a delay occurs, and the thread 220 will unexpectedly be using the resource 200 for a longer period of time, the BUSY code 150-3 can be reset to "yield." Nonetheless, at step 955, once use of the resource 200 is complete, the busy resource encoder 150 sets the BUSY code 150-3 to "available," thereby notifying any competing threads 230 that the resource is ready to be used by a new thread at step 960.

Other embodiments disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained as embodiments disclosed herein.

Note again that techniques herein are well suited for a busy resource encoder 150 to allow for a decision to be made regarding an expected contention for individual resources between one or more threads (i.e. processes, operations) by updating "busy" information as a contending operation progresses in its use of the resource. Specifically, a BUSY code 150-3 is used to provide information from the owner of the resource about when the resource is likely to be available. However, it should be noted that embodiments herein are not limited to use in such applications and that the techniques discussed herein are well suited for other applications as well. While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

What is claimed is:

1. A method, comprising:

executing a first thread, the first thread using a resource;

executing a second thread, the second thread requiring use of the resource which is locked due to first thread execution;

creating a busy code to indicate progress of the execution of the first thread in relation to use of the resource by the first thread, including assigning a value to a variable according to a measure of completeness of the execution of the first thread in relation to use of the resource, wherein, when the resource is locked, the variable includes a yield value or a spin value, the yield value indicating to the second thread to execute a yield routine to cause the second thread to be notified when the resource is available, the spin value specifying, based on the measure of completeness, a number of spin-loop cycles of a spin routine to be executed by the second thread to wait for the resource to be available before attempting to read the busy code again, the spin value providing information from the first thread regarding when the resource is likely to be available;

reading the busy code to determine whether the variable advises to execute the spin routine or the yield routine; and in response to determining that the variable includes the spin value, executing one of the spin routine or the yield routine by the second thread based on the value of the variable and a maximum spin cycle count defined for the second thread, the maximum spin cycle count specifying a count of spin-loop cycles of the spin routine, such that when the spin value exceeds the maximum spin cycle count, the second thread executes the yield routine despite the value of the variable advising to execute the spin routine.

2. The method as in claim 1, further comprising:
updating the busy code to reflect a current state of progress of the execution of the first thread in relation to use of the resource by the first thread; and
reading the updated busy code.

3. The method as in claim 2, wherein reading the updated busy code include:
determining to execute at least one of the following:
   i) the spin routine by at least one of the second thread and another thread;
   ii) the yield routine by at least one of the second thread and another thread;
   iii) a spin routine currently in progress by the second thread; or
   iv) a yield routine currently in progress by the second thread.

4. The method as in claim 1, wherein creating the busy code to indicate the progress of the execution of the first thread in relation to use of the resource by the first thread includes updating the value of the variable, the variable corresponding to the resource and indicating an availability of the resource with respect to the progress of the executing of the first thread.

5. The method as in claim 4, wherein updating the value of the variable includes:
monitoring execution of the first thread in relation to use of the resource;
as a result of monitoring the execution of the first thread, producing the measure of completeness of the execution of the first thread in relation to use of the resource; and
changing the value of the variable according to the measure of completeness of the execution of the first thread in relation to use of the resource.

6. The method as in claim 5, wherein changing the value of the variable according to the measure of completeness of the execution of the first thread in relation to use of the resource includes assigning the variable a predetermined access value to indicate to the second thread that the progress of the execution of the first thread in relation to use of the resource by the first thread is complete and the resource is unlocked and available to the second thread.

7. The method as in claim 1, further comprising processing the busy code according to a consideration of at least one of a machine state metric, a second thread metric, and a resource metric.

8. The method of claim 1, wherein a lower order bit of the variable of the busy code indicates whether the busy code is an access value specifying a forwarding pointer to the resource in an unlocked state or the spin value specifying the number of spin-loop cycles of the spin routine to be executed by the second thread.

9. The method of claim 1, wherein the number of spin-loop cycles of the spin routine represents a count of spin-loop cycles until the resource will be available.

10. A non-transitory computer readable medium comprising computer executable instructions encoded thereon, the instructions operable on a computerized device to perform processing and comprising instructions for:
executing a first thread, the first thread using a resource;
executing a second thread, the second thread requiring use of the resource which is locked due to first thread execution;
creating a busy code to indicate progress of the execution of the first thread in relation to use of the resource by the first thread, including assigning a value to a variable according to a measure of completeness of the execution of the first thread in relation to use of the resource, wherein, when the resource is locked, the variable includes a yield value or a spin value, the yield value indicating to the second thread to execute a yield routine to cause the second thread to be notified when the resource is available, the spin value specifying, based on the measure of completeness, a number of spin-loop cycles of a spin routine to be executed by the second thread to wait for the resource to be available before attempting to read the busy code again, the spin value providing information from the first thread regarding when the resource is likely to be available;
reading the busy code to determine whether the variable advises to execute the spin routine or the yield routine; and
in response to determining that the variable includes the spin value, executing one of the spin routine or the yield routine by the second thread based on the value of the variable and a maximum spin cycle count defined for the second thread, the maximum spin cycle count specifying a count of spin-loop cycles of the spin routine, such that when the spin value exceeds the maximum spin cycle count, the second thread executes the yield routine despite the value of the variable advising to execute the spin routine.

11. The computer readable medium as in claim 10, the computer executable instructions further comprising instructions for:
updating the busy code to reflect a current state of progress of the execution of the first thread in relation to use of the resource by the first thread; and
reading the updated busy code, which include instructions for determining to execute at least one of the following:
   i) the spin routine by at least one of the second thread and another thread;
   ii) the yield routine by at least one of the second thread and another thread;
   iii) a spin routine currently in progress by the second thread; or
   iv) a yield routine currently in progress by the second thread.

12. The computer readable medium as in claim 10, wherein the instructions for creating the busy code to indicate the progress of the execution of the first thread in relation to use of the resource by the first thread include instructions for updating the value of the variable, the variable corresponding to the resource and indicating an availability of the resource with respect to the progress of the executing of the first thread.

13. The computer readable medium as in claim 12, wherein the instructions for updating the value of the variable include instructions for:
monitoring execution of the first thread in relation to use of the resource;
producing at least one measure of completeness of the execution of the first thread in relation to use of the resource, as a result of monitoring the execution of the first thread; and
changing the value of the variable according to the measure of completeness of the execution of the first thread in relation to use of the resource.

14. The computer readable medium as in claim 13, wherein the instructions for changing the value of the variable according to the measure of completeness of the execution of the first thread in relation to use of the resource include instructions for assigning the variable a predetermined access value to indicate to the second thread that the progress of the execution of the first thread in relation to use of the resource by the first thread is complete and the resource is unlocked and available to the second thread.

15. The computer readable medium as in claim 10, wherein the instructions further include instructions for processing the busy code according to a consideration of at least one of a machine state metric, a second thread metric, and a resource metric.

16. A computer system comprising:
   a processor;
   a memory unit that stores instructions associated with an application executed by the processor; and
   an interconnect coupling the processor and the memory unit, enabling the processor to execute the application and perform operations of:
   executing a first thread, the first thread using a resource;
   executing a second thread, the second thread requiring use of the resource which is locked due to first thread execution;
   creating a busy code to indicate progress of the execution of the first thread in relation to use of the resource by the first thread, including assigning a value to a variable according to a measure of completeness of the execution of the first thread in relation to use of the resource, wherein, when the resource is locked, the variable includes a yield value or a spin value, the yield value indicating to the second thread to execute a yield routine to cause the second thread to be notified when the resource is available, the spin value specifying, based on the measure of completeness, a number of spin-loop cycles of a spin routine to be executed by the second thread to wait for the resource to be available before attempting to read the busy code again, the spin value providing information from the first thread regarding when the resource is likely to be available;
   reading the busy code to determine whether the variable advises to execute the spin routine or the yield routine; and
   in response to determining that the variable includes the spin value, executing one of the spin routine or the yield routine by the second thread based on the value of the variable and a maximum spin cycle count defined for the second thread, the maximum spin cycle count specifying a count of spin-loop cycles of the spin routine, such that when the spin value exceeds the maximum spin cycle count, the second thread executes the yield routine despite the value of the variable advising to execute the spin routine.

17. The computer system of claim 16, wherein the processor performs the further operations of:
   updating the busy code to reflect a current state of progress of the execution of the first thread in relation to use of the resource by the first thread; and
   reading the updated busy code.

18. The computer system of claim 17, wherein the operation of reading the updated busy code includes the operation of:
   determining to execute at least one of the following:
      i) the spin routine by at least one of the second thread and another thread;
      ii) the yield routine by at least one of the second thread and another thread;
      iii) a spin routine currently in progress by the second thread; or
      iv) a yield routine currently in progress by the second thread.

19. The computer system of claim 17, wherein the operation of creating the busy code to indicate the progress of the execution of the first thread in relation to use of the resource by the first thread includes the operation of updating the value of the variable, the variable corresponding to the resource and indicating an availability of the resource with respect to the progress of the executing of the first thread.

20. The computer system of claim 19, wherein the operation of updating the value of the variable includes the operations of:
   monitoring execution of the first thread in relation to use of the resource;
   as a result of monitoring the execution of the first thread, producing the measure of completeness of the execution of the first thread in relation to use of the resource; and
   changing the value of the variable according to the measure of completeness of the execution of the first thread in relation to use of the resource.

* * * * *

UNITED STATES PATENT AND TRADEMARK OFFICE
CERTIFICATE OF CORRECTION

PATENT NO. : 9,223,637 B1  
APPLICATION NO. : 11/831292  
DATED : December 29, 2015  
INVENTOR(S) : Kessler Page 1 of 1

It is certified that error appears in the above-identified patent and that said Letters Patent is hereby corrected as shown below:

In the drawings,

On sheet 5 of 9, in FIG. 5, under reference numeral 520, line 2, delete "SECONDTHREAD" and insert -- SECOND THREAD --, therefor.

In the specification,

In column 5, line 21, delete "psuedocode," and insert -- pseudocode, --, therefor.

In column 6, line 4, delete "the the" and insert -- the --, therefor.

In column 9, line 51, delete "endcoder" and insert -- encoder --, therefor.

In column 9, line 54, after "termination of" delete "the".

Signed and Sealed this  
Twenty-third Day of August, 2016

Michelle K. Lee  
*Director of the United States Patent and Trademark Office*